US008388276B2

(12) United States Patent
Jaillon et al.

(10) Patent No.: US 8,388,276 B2
(45) Date of Patent: Mar. 5, 2013

(54) MACHINE TOOL

(75) Inventors: Jacques Jaillon, Noisy le Sec (FR);
Jérome Galand, Pontault Combault (FR)

(73) Assignee: Cooper Power Tools SAS, Ozoir la Ferriere (FR)

(*) Notice: Subject to any disclaimer, the term of this patent is extended or adjusted under 35 U.S.C. 154(b) by 1323 days.

(21) Appl. No.: 12/104,922

(22) Filed: Apr. 17, 2008

(65) Prior Publication Data
US 2008/0260485 A1 Oct. 23, 2008

(30) Foreign Application Priority Data

Apr. 7, 2007 (FR) ...................................... 07 54515

(51) Int. Cl.
B23B 35/00 (2006.01)
B23B 47/18 (2006.01)
(52) U.S. Cl. .............. 408/1 R; 408/9; 408/10; 408/138; 408/141
(58) Field of Classification Search .................. 408/1 R, 408/5–12, 17, 141, 138, 137
See application file for complete search history.

(56) References Cited

U.S. PATENT DOCUMENTS

| 2,453,136 | A | | 11/1948 | Karweit et al. | |
| 3,574,290 | A | | 4/1971 | Eckman | |
| 3,583,822 | A | | 6/1971 | Alexander et al. | |
| 3,720,135 | A | * | 3/1973 | Merner et al. ................. | 409/188 |
| 3,767,313 | A | * | 10/1973 | Bohoroquez et al. ........... | 408/14 |
| 3,838,934 | A | | 10/1974 | Petroff | |
| 4,083,646 | A | | 4/1978 | Vindez | |
| 4,097,177 | A | * | 6/1978 | Close ............................ | 408/132 |
| 4,111,590 | A | | 9/1978 | Burkart et al. | |
| 4,443,139 | A | | 4/1984 | Eash | |
| 4,591,299 | A | | 5/1986 | Eckman | |
| 4,592,681 | A | | 6/1986 | Pennison et al. | |
| 4,612,998 | A | | 9/1986 | Vindez | |
| 4,681,490 | A | | 7/1987 | Pennison et al. | |
| 4,688,970 | A | | 8/1987 | Eckman | |
| 4,691,787 | A | * | 9/1987 | Akesaka ........................ | 173/145 |
| 4,799,833 | A | | 1/1989 | Pennison et al. | |
| 4,850,753 | A | | 7/1989 | Dudden | |
| 5,100,271 | A | * | 3/1992 | Kameyama et al. .......... | 409/231 |
| 5,143,161 | A | | 9/1992 | Vindez | |
| 5,149,232 | A | | 9/1992 | Eckman | |

(Continued)

FOREIGN PATENT DOCUMENTS

DE 19 58 412 5/1971
DE 37 42 725 7/1989

(Continued)

Primary Examiner — Daniel Howell
(74) Attorney, Agent, or Firm — King & Spalding LLP

(57) ABSTRACT

The present invention describes a machine to that includes a casing and a toolholder spindle. The machine tool further includes a drive mechanism that drives the toolholder spindle. The drive mechanism includes first and second drive members. The first drive member rotates the spindle about its axis. The second drive member translates the spindle and is screwed onto the spindle in such a way that the spindle advances or reverses as a function of the relative speed of rotation between the first and second drive members. The machine tool also includes a first motor and a second motor. The first motor rotates the first drive member and the second motor rotates the second drive member. The machine too further includes a control unit that controls and adjusts the speed of rotation of the first motor and the second motor independently.

19 Claims, 5 Drawing Sheets

| U.S. PATENT DOCUMENTS | | | |
|---|---|---|---|
| 5,351,797 A | 10/1994 | Lawson et al. | |
| 6,193,447 B1 | 2/2001 | Thames et al. | |
| 6,196,772 B1 | 3/2001 | Thames et al. | |
| 6,261,033 B1 | 7/2001 | Thames et al. | |
| 2006/0018724 A1 | 1/2006 | Oehninger et al. | |
| 2009/0022555 A1 | 1/2009 | Oehninger et al. | |
| 2009/0074525 A1 | 3/2009 | Jaillon | |

| FOREIGN PATENT DOCUMENTS | | |
|---|---|---|
| FR | 2 829 952 | 3/2003 |
| FR | 2 873 315 | 1/2006 |
| GB | 2 105 622 | 3/1983 |
| GB | 2 245 995 | 1/1992 |

* cited by examiner

MACHINE TOOL

STATEMENT OF RELATED PATENT APPLICATION

This non-provisional patent application claims priority under 35 U.S.C. § 119 to French Patent Application No. 07 54515, titled A Machine Tool, filed Apr. 17, 2007. This French application is hereby fully incorporated herein by reference.

FIELD OF THE INVENTION

The present invention relates to the field of machine tools. More specifically, the present invention relates to a machine tool that includes a control unit for independently controlling the speed of rotation of a cutting tool and the speed of advance of the cutting tool.

BACKGROUND OF THE INVENTION

The invention is applicable to aircraft construction, for example.

Document FR-2 873 315 describes a positive feed drill, i.e. a drilling machine for drilling a bore or passage, having a drive mechanism, and being of the kind known as a positive feed drill. A single motor drives the spindle in rotation about its axis, via the drive mechanism, while at the same time advancing or reversing the spindle in translation along its axis.

Since the drives in translation and in rotation for the spindle are linked mechanically together, the amount by which the spindle is advanced on every revolution, that is to say the amplitude of the movement in translation of the spindle for each revolution of the spindle, is constant. Variations in motor speed do not therefore affect the magnitude of this advance per revolution. The thickness of the swarf that is formed therefore stays constant, which is beneficial in terms of surface quality and precision of the bores (or passages) drilled by such a machine tool.

In another version, the displacement of the first drive member and the displacement of the second drive member may be obtained with the use of two separate motors coupled together electronically. The speeds of rotation of the first drive member and second drive member are therefore linked, so as to advance the spindle by a constant amount for each revolution.

Although such machines have proved generally satisfactory, their use for drilling bores (passages) in elements that consist of a plurality of layers of different materials can be tricky. For each of the materials involved there is both an optimum speed of rotation for the cutting tool (tool bit) and an optimum amount of advance per revolution.

If the drilling machine can be adjusted accordingly in order to satisfy the optimum conditions for drilling one of the layers, then drilling of the other layers takes place under conditions that are not optimized, and this results in bores of degraded quality and/or long drilling times.

OBJECTS AND SUMMARY OF THE INVENTION

An object of the invention is therefore to resolve these problems, by providing a machine that enables components consisting of a plurality of layers of different materials to be machined to a satisfactory quality and with a reduction in drilling time.

To this end, according to the invention a machine tool of the above-specified type is wherein the control unit is adapted to control the first motor and second motor independently, so as to adjust, independently of each other, the speed of rotation of the first drive member and the speed of rotation of the second drive member.

In particular embodiments, the machine tool incorporates one or more of the following features, taken singly or in any technically feasible combination:
  the control unit is adapted to control the first motor and second motor in such a way that the ratio between the speed of rotation of the first drive member and the speed of rotation of the second drive member is adjustable;
  the first motor and the second motor are electric motors, the machine tool having at least one sensor for measuring a quantity that represents the output torque of at least one of the motors, for the purpose of modifying the speed of rotation of at least one of the drive members;
  the quantity that represents the said torque is the current supplied to the said motor;
  control programs for the first motor and second motor are stored in the control unit, the programs being adapted so that the control unit controls rotation of the first motor and second motor as a function of the characteristics of the materials and/or the machining operation to be performed;
  the programs are adapted so that the control unit controls rotation of the first motor and second motor in such a way as to modify the speed of rotation of at least one of the drive members as a function of the characteristic quantity;
  the first motor has a first output shaft arranged to rotate the first drive member, the second motor has a second output shaft arranged to rotate the second drive member, and the first shaft and second shaft are arranged one within the other;
  a module comprises the first motor and second motor, the module being mounted removably on the casing;
  the control unit is adapted to control the first motor and second motor in such a way that:
    the first drive member rotates at constant speed; and
    the second drive member rotates at a speed having an instantaneous value that oscillates about a mean value;
  the machine tool is adapted for modifying the speed of rotation of at least one of the drive members as a function of the result of a comparison between, firstly a value of the quantity that represents the output torque of at least one of the motors measured by the measuring sensor, and secondly a predetermined value stored in the control unit;
  the quantity that represents the torque is the current supplied to the said motor;
  the machine tool is a drilling machine and the spindle is adapted to carry a drill bit for forming a bore.

The invention is also directed to a method of machining, which method being carried out using a machine tool such as that set forth above.

In particular implementations, the method incorporates one or more of the following features, taken singly or in any technically feasible combination:
  the method includes a step during which the control unit controls the first motor and the second motor in such a way that:
    the first drive member rotates at constant speed; and the second drive member rotates at a speed having an instantaneous value that oscillates about a mean value;

the control unit is adapted to control the first motor and second motor in such a way that the ratio between the speed of rotation of the first drive member and the speed of rotation of the second drive member is adjustable, the first motor and the second motor being electric motors and the machine tool having at least one sensor for measuring a quantity that represents the output torque of at least one of the motors, for the purpose of modifying the speed of rotation of at least one of the drive members, and the method includes the following steps:

measuring, by means of the measuring sensor, a quantity that represents the output torque of at least one of the motors;

making a comparison between the value of the said representative quantity and a predetermined value stored in the control unit; and modifying the speed of rotation of at least one of the drive members as a function of the result of the said comparison;

the quantity that represents the torque is the current supplied to the said motor; and the method is a method of drilling a bore.

BRIEF DESCRIPTION OF THE DRAWINGS

The invention can be understood more clearly on a reading of the following description, which is given by way of example only and with reference to the attached drawings, in which:

FIG. 1 shows a portable machine tool 1, having the following main components:

Figure 1:
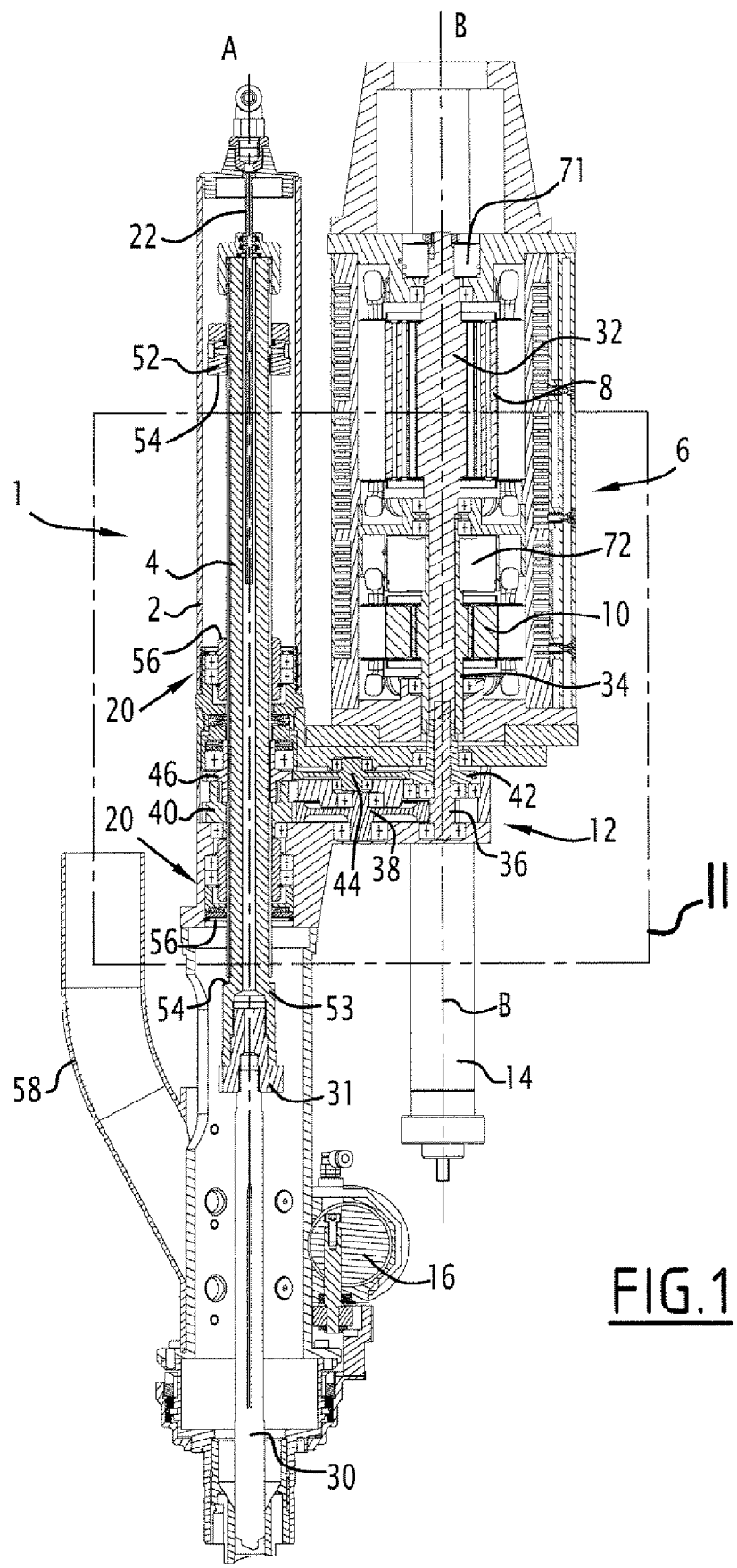
FIG. 1 is a diagrammatic side view in cross-section of a machine tool of the invention.

a casing 2;

a toolholder spindle 4 disposed along a vertical axis A;

a module 6 that includes a first electric motor 8 and a second electric motor 10; and a drive mechanism 12 for driving the spindle 4 and coupling the spindle 4 to the first motor 8 and second motor 10;

a handle 14 for carrying the machine tool 1; and an element 16 for securing the machine tool 1 on a support (not shown).

The spindle 4 is received in the casing 2 in such a way that it is rotatable about its axis A and movable in translation along the axis A. For this purpose the casing 2 has guide means for guiding the spindle 4, comprising a pair of bearings 20 on the axis A, together with an internal guide rod 22, also on the axis A and arranged for delivering cutting fluid for drilling operations.

The internal guide rod 22 is fixed relative to the casing 2, and is loosely received in the spindle 4.

A tool bit 30, in the form of a drill bit, is fitted removably in the lower end 31 of the spindle 4, for the drilling of bores (passages).

Figure 3:
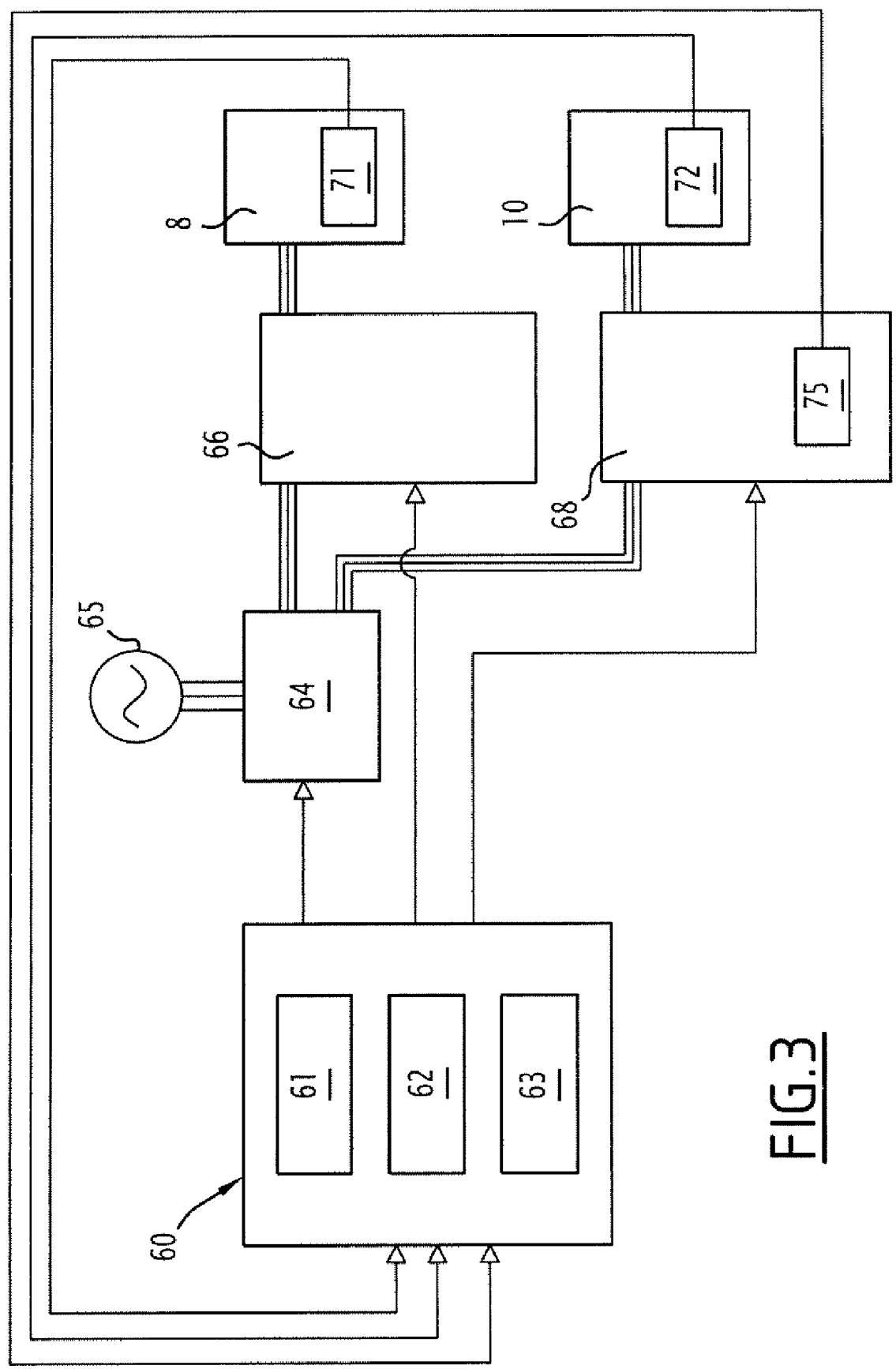
FIG. 3 is a diagram showing the control unit of the machine tool shown in FIG. 1.

The first motor 8 is disposed above the second motor 10 (with reference to the orientation of the machine tool 1 in FIGS. 1 and 3). The first motor 8 has an output shaft 32, referred to as the first output shaft 32, while the second motor 10 has an output shaft 34 that is referred to as the second output shaft 34.

The first shaft 32 extends through the second motor 10. For this purpose the second shaft 34 is hollow, and the first shaft 32 is received inside the second shaft 34. The first shaft 32 and second shaft 34 are thus engaged coaxially one within the other, but they are able to rotate freely relative to each other.

The drive mechanism 12 includes the following elements:

a first input shaft 36 with an axis B, which is received coaxially in the first output shaft 32 in such a way that it is rotatable with the shaft 32;

a first intermediate gearwheel 38 that is in mesh with the first input shaft 36;

a first drive gearwheel 40 that is in mesh with the first intermediate gearwheel 38;

a second input shaft 42, on the axis B, that is received coaxially in the second output shaft 34 in such a way as to be rotatable with the shaft 34;

a second intermediate gearwheel 44, that is disposed above the first intermediate gearwheel 38 and that is in mesh with the second input shaft 42; and a second drive gearwheel 46, overlying the first drive gearwheel 40 and meshing with the second intermediate gearwheel 44, both the first drive gearwheel 40 and the second drive gearwheel 46 being on the axis A.

The bearings 20 are disposed on either side of the drive gearwheels 40 and 46.

The first input shaft 36 and second input shaft 42 are coaxially engaged one inside the other, and are able to rotate freely relative to each other. Similarly, the intermediate gearwheels 38 and 44 are freely rotatable relative to each other. The input shafts 36 and 42 are able to rotate in the casing 2 about the axis B, but they are prevented from moving axially on the axis B.

The first input shaft 36 is longer than the second input shaft 42, and extends beyond the input shaft 42 at both ends.

The module 6 includes a releasable fastening device (not shown) for fixing the module 6 on the casing 2 and for enabling the module 6 to be withdrawn. This consists for example of a clamp with a pneumatic actuator, of a known kind, or, in another example, magnetic suckers. In the example described here, once this fastening device is released, the module is moved along the axis B to separate it from the casing 2.

The coupling between the first input shaft 36 and the first output shaft 32, and the coupling between the second input shaft 42 and the second output shaft 34, permits movement in translation of both of the output shafts 32 and 34 along the axis B relative to the casing 2, in such a way that the module 6 is removable from the casing 2 by simple movement along the axis B. These couplings may for example be made by means of mating splines.

The first gearwheels 38 and 40 and the second intermediate gearwheel 44 are blocked against axial movement in the casing 2. They are only rotatable on their respective axes. As to the second drive gearwheel 46, this is rotatable about the axis A and movable axially by a small amount along the axis A, so as to afford damping of the spindle 4 as the spindle reaches the end of its forward stroke, as is explained below. However, during a drilling or milling operation, the second drive gear-wheel 46 is in the position shown in FIGS. 1 and 2.

The first drive gearwheel 40 is screwed on the spindle 4, to which it is fixed for rotation together. The spindle 4 is movable in translation relative to the gearwheel 40 along the axis A. This coupling between the spindle 4 and first gear-wheel 40 consists, for example, of mating splines.

The second drive gearwheel 46 has an internal screw thread that cooperates with an external screw thread formed on the spindle 4. The second gearwheel 46 is thereby screwed on the spindle 4 in a known way.

Due to the helical coupling between the spindle 4 and the second drive gearwheel 46, the gearwheel 46 urges the spindle 4 in translation along the axis A as a function of the relative speed of rotation between the second drive gearwheel 46 and the spindle 4, that is to say as a function of the relative speed of rotation between the second drive gearwheel 46 and the first drive gearwheel 40.

Where the spindle 4 is rotated in a clockwise direction, the helical coupling between the spindle 4 and the second drive gearwheel 46 is left-handed in the example shown. In this way, the advancing movement of the spindle 4, that is to say its downward movement in translation along the axis A (in FIGS. 1 and 2), is ensured when the speed of rotation of the second drive gearwheel 46 is greater than the speed of rotation of the first drive gearwheel 40.

Conversely, the return movement of the spindle 7, that is to say its upward translation along the axis A (in FIGS. 1 and 2), is obtained when the speed of rotation of the second drive gearwheel 46 is smaller than the speed of rotation of the first drive gearwheel 40.

The effective diameters of the gearwheels 38, 40, 44 and 46 are for example such that, when the speed of rotation of the first output shaft 32 is equal to that of the second output shaft 34, the speed of rotation of the second drive gearwheel 46 is a little greater than that of the second drive gearwheel 40, and the spindle 4 is driven downward in translation.

The drive mechanism 12 further includes a thrust mechanism 47 (see FIG. 2) for exerting an axial thrust on the second gearwheel 46. This mechanism 47 comprises damping means in the form of two elastic rings, namely an upper ring 48 and a lower ring 49, together with a cage 50 that bears on the second gear-wheel 46.

The two thrust rings 48 and 49 are mounted under pre-stress, coaxially and one above the other. The upper thrust ring 48 bears on a rearwardly facing surface 51 of the casing 2, while the lower thrust ring 48 bears on the ring 48.

The cage 50 is free to make a small amount of movement in translation along the axis A, but is secured against rotation relative to the casing 2. It receives the second drive gearwheel 46 that is freely rotatable and freely movable axially by virtue of needle rollers. The cage 50 bears on the lower thrust ring 49.

In order to limit the stroke of the advancing movement of the spindle 4 along the axis A, the spindle 4 has a rear end stop abutment 52 and a leading end stop abutment 53.

The abutments 52 and 53 are fixed relative to the spindle 4, and each of them has an engagement surface 54 for cooperation with a respective surface 56.

Figure 2:
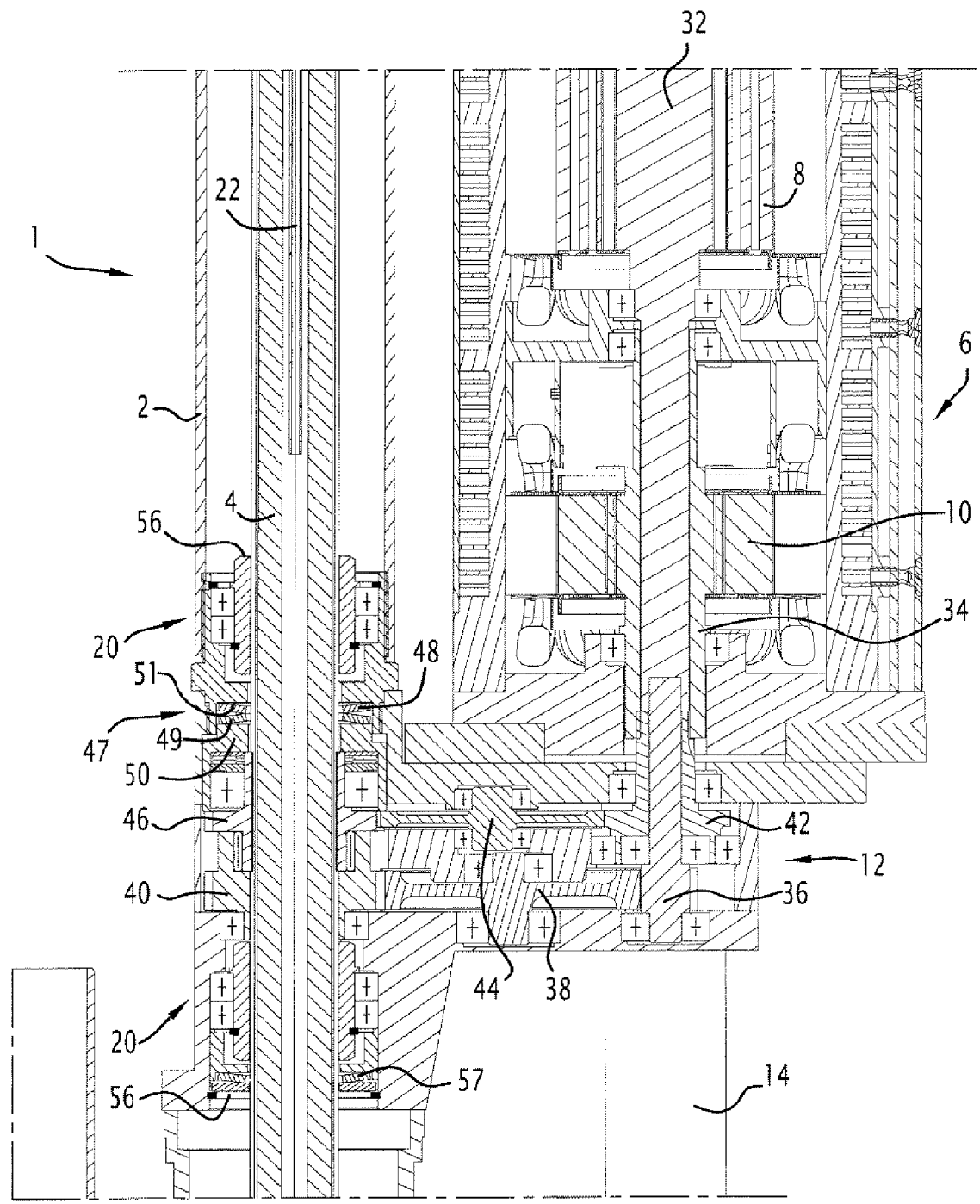
FIG. 2 repeats the portion II of FIG. 1, on a larger scale.

During the drilling operation, the thrust mechanism 47 exerts a sufficiently high thrust to maintain the second drive gearwheel 46 in the position shown in FIGS. 1 and 2. The possibility that the gearwheel 46 might be displaced axially, which involves some deformation of the thrust rings 48 and 49, enables the forward stroke of the spindle 4 to be damped. Damping at the end of the backward stroke is obtained by virtue of an elastic thrust ring 57 (see FIG. 2).

The casing 2 further includes a chute 58 for evacuation of swarf formed in a drilling operation.

As is shown in FIG. 3, the machine tool 1 further includes:

an electronic control unit 60 that is adapted to control the first motor 8 and second motor 10 independently, the unit 60 having a memory 61, a touch-sensitive display screen 62, and a processor 63;

a contactor 64, connected to a source 65 of electrical energy and controlled by the unit 60;

a first variator 66, for varying the power supplied to the first motor 8 and for controlling the speed of rotation of the first motor 8; and a second variator 68, for varying the power supplied to the second motor 10 and for controlling the speed of rotation of the second motor 10.

The power source 65 supplies, for example, a three-phase alternating current voltage of about 400V.

The motors 8 and 10 are for example of the brushless kind.

The first motor 8 includes a sensor 71 for measuring the speed of rotation of the first output shaft 32, while the second motor 10 has a sensor 72 for measuring the speed of rotation of the second output shaft 34.

The first variator 66 and second variator 68 are connected to the motors 8 and 10, and are also connected to the contactor 64 for supplying them with power. They are further connected, like the contactor 64, to the control unit 60 so that they can be controlled by the unit 60.

The second variator 68 includes a sensor 75 for measuring the root mean square (rms) current delivered to the second motor 10.

Each of the sensors 71, 72 and 75 is connected to the control unit 60 so as to supply it with signals representing the values measured by the sensors.

The control unit 60 is adapted so that it can control the rotation of the first motor 8 and second motor 10 independently of each other, whereby to modify the speed of rotation of the spindle 4 and/or the distance advanced by the spindle 4 in each of its revolutions.

It should be recalled that the speed of rotation of the spindle 4 is equal to the speed of rotation of the first drive gearwheel 40, and that it therefore depends on the speed of rotation of the first output shaft 32. The distance advanced by the spindle 4 in each of its revolutions is equal to the difference between the speed of rotation of the second drive gearwheel 46 and the speed of rotation of the first drive gear-wheel 40, divided by the speed of rotation of the first drive gearwheel 40, all multiplied by the pitch of the internal screw thread of the second drive gearwheel 46. It is for example expressed in millimeters per revolution of the spindle 4.

The control unit 60 may for example modify the speed of rotation of the drive gearwheels 40 and 46, while maintaining constant the ratio between the speed of rotation of the first drive gearwheel 40 and the speed of rotation of the second drive gearwheel 46. In this way, the unit 60 modifies the speed of rotation of the spindle 4, but the advance per revolution of the spindle 4 is not modified.

The unit 60 is also arranged for modifying the speed of rotation of the second drive gearwheel 46, while maintaining constant the speed of rotation of the first drive gearwheel 40. The speed of rotation of the spindle 4 is thus not modified, but the ratio between the speed of rotation of the first drive gear-wheel 40 and the speed of rotation of the second drive gear-wheel 46 is modified. The speed of rotation of the spindle 4 is therefore constant, but the advance per revolution of the spindle 4 is modified.

The control unit 60 is also adapted for modifying the speed of rotation of the spindle 4 and its advance per revolution at the same time.

The various possibilities are preferably realized by the use of control programs for the first motor 8 and second motor 10 that are stored in the memory 61 of the control unit 60.

These programs are such that the unit 60 controls the operation of the first motor 8 and second motor 10 as a function of data obtained by the operator using the screen 62. This data is for example concerned with the type of spindle 4, and the number and nature of the layers of material through which drilling is to take place.

The operation of the machine tool 1 is described below with reference to FIG. 4 that shows the variations in rms current delivered to the second motor 10 during an operation of drilling an element consisting of two layers of different materials, namely a composite layer of carbon fiber base and an aluminum layer.

The operator has selected the appropriate control program beforehand, specifying on the screen 62 the characteristics of the element to be drilled, and in particular the number and nature of its various layers, so that the control unit 60 then automatically ensures that the operation is performed by the method to be described below.

In the example shown, the torque exerted by the output shaft 34 on the second motor 10 is substantially proportional to the rms current supplied by the second variator 68.

Figure 4:
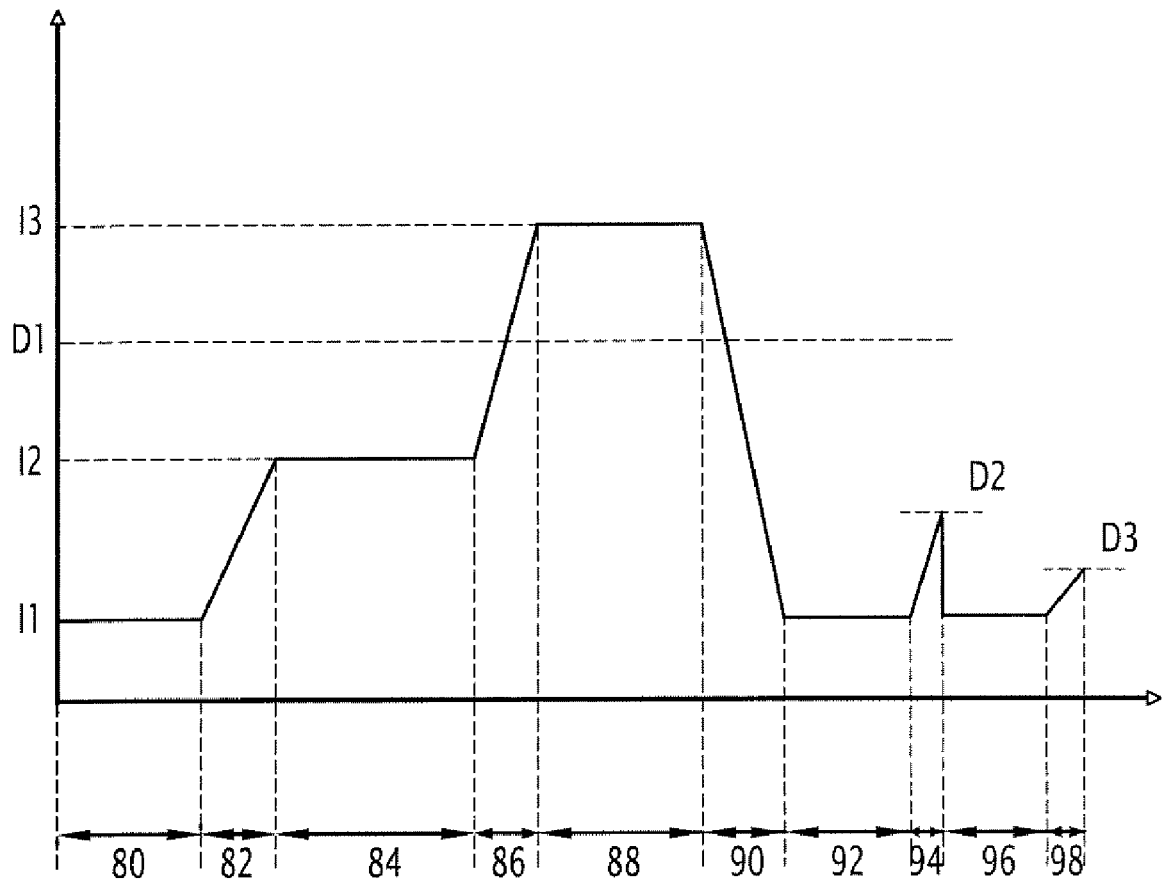
FIG. 4 is a graph showing various stages in a method of drilling using the machine tool shown in FIG. 1.

In FIG. 4, time is represented by the abscissa axis, while the rms current is represented by the ordinate axis.

At the start of the operation, the spindle 4 is in its retracted position in the casing 2, and the drill bit 30 is spaced away from the element to be drilled. The leading abutment 53 is engaged on the corresponding surface 56.

In a first stage 80, the drill bit 30 advances towards the element to be drilled, without being in contact with that element, and the rms current supplied has a substantially constant value I1.

During drilling of the first layer of material by the bit 30, the torque exerted by the second output shaft 34 increases, and the current supplied to the second motor 10 increases linearly, as illustrated by the second stage 82.

In a third stage 84, the rms current stabilizes about a substantially constant value I2.

In the example shown, the material of the second layer is harder than the material of the first layer. Thus, when the second layer of material is being drilled, which corresponds to the fourth stage 86, the rms current increases linearly, passing through a threshold value D1 that is stored in the memory 61. When the control unit 60, by means of the sensor 75, senses that this threshold value has been passed, the unit 60 issues a command, in the example shown, for a reduction in the speed of rotation of the spindle 4, while keeping constant the amount of advance per revolution of the spindle 4.

As can be gathered from FIG. 4, the rms current supplied to the second motor 10 continues to increase linearly. Even if the speed of rotation of the second motor 10, and therefore also the voltage supplied to the second motor 10, have diminished, the torque exerted by the second output shaft 34, and therefore also the rms current supplied to the second motor 10, continue to increase.

The rms current subsequently stabilizes, in a fifth stage 88, about a substantially constant value I3.

When the tip of the bit 30 emerges from the element being drilled, the rms current being supplied to the second motor 10 diminishes progressively, in a sixth stage 90, until it reaches a value substantially equal to I1.

The spindle 4 then continues its forward movement in a seventh stage 92, until the end stop abutment 52 comes into engagement against the corresponding surface 56.

This engagement leads to a new increase in the rms current being supplied to the second motor 10 during an eighth stage 94, as shown in FIG. 4.

When the value of current measured by the second sensor 75 exceeds a value D2 for the end of the forward stroke, the control unit 60 automatically causes the second motor 10 to be stopped. In contrast, the first output shaft 32 of the first motor 8 continues to rotate at the same speed.

During this stage, a ninth stage 96, the second drive gearwheel 46 is thus prevented from rotating while the first drive gearwheel 40 continues to rotate, resulting in a reversing movement of the spindle 4. The rms current being supplied to the second motor 10 is then substantially constant.

In the same way as for the end of the forward stroke, when the value of the rms current being supplied to the second motor 10, as measured by the sensor 75, exceeds a value D3 for the end of the backward stroke, the control unit 60 causes the first motor 8 to be stopped.

As at the end of the forward stroke, the engagement of the end stop abutment 53 on the corresponding surface 56 causes the rms current being supplied to the second motor 10 to be increased.

It can therefore be understood that the control unit 60 is adapted to modify the speed of rotation of the spindle 4, and the amount of advance per revolution of the spindle 4, independently of each other and as a function of the rms current supplied to the second motor 10, and therefore also as a function of the torque exerted by the second motor 10.

The machine tool 1 is accordingly able to adapt for workpieces consisting of a plurality of layers of different materials. For each type of material, the unit 60 causes the spindle 4 to rotate at an optimum speed, and with an optimum amount of advance for each revolution. These optimum values are stored in the memory 61, and are selected by the control programs as a function of the data that the operator inputs through the screen 62.

The machine tool 1 can also be arranged for the swarf produced to be evacuated, thereby enabling a passage or bore to be drilled with very high precision.

Figure 5:
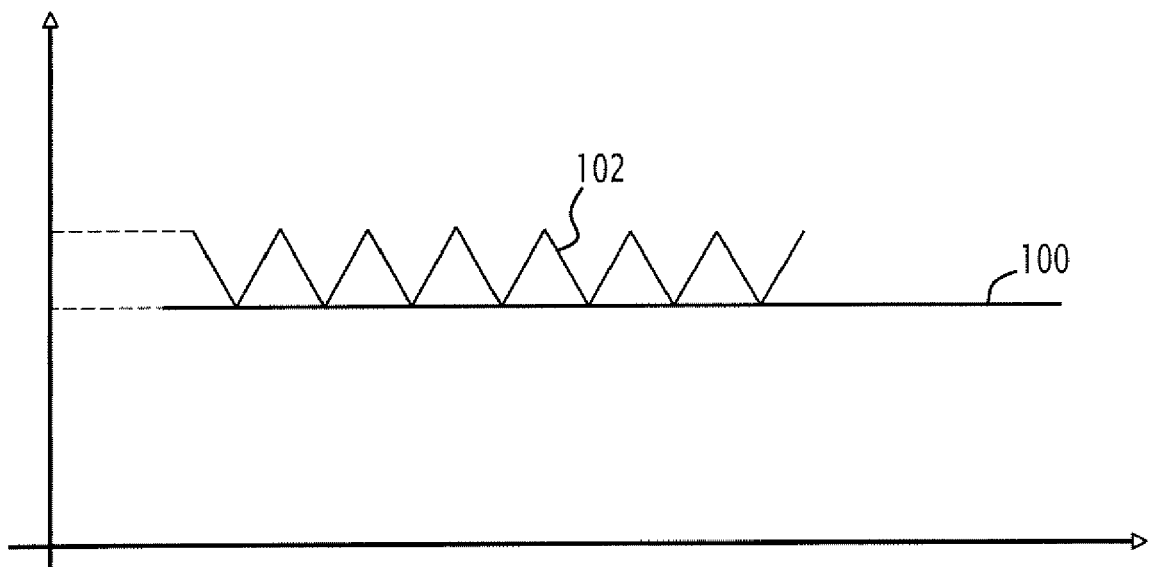
FIG. 5 is a graph showing another version of the drilling method of the invention.

In this regard, as is shown by FIG. 5, the control unit 60 is able to control the second motor 10 in such a way that the speed of rotation of the second drive gearwheel 46 varies about a mean value that is higher than the speed of rotation of the first drive gearwheel 40.

In FIG. 5, the abscissa axis represents time, while the ordinate axis corresponds to speed of rotation. The speed of rotation of the first drive gearwheel 40 is represented by a first curve 100, while the speed of rotation of the second drive gearwheel 46 is represented by a second curve 102.

An oscillating translation of the spindle 4 along the axis A is therefore combined with the general advancing movement of the spindle 4. This oscillating motion has a substantially constant amplitude. This amplitude is quite small, so that the spindle remains inside the passage or bore during the drilling operation.

The amplitude of the oscillation is typically equal to the distance moved along the axis A by the spindle in the course of one revolution of the first drive gearwheel 40 relative to the second drive gearwheel 46, that is to say it is equal to the pitch of the internal screw thread of the second drive gear-wheel 46 and the external thread of the spindle 4.

In the example illustrated by FIG. 5, the advance per revolution of the spindle 4 oscillates between a positive value and a zero value.

The oscillating forward movement of the spindle causes the swarf formed to be broken off each time the amount of advance per revolution is reduced.

This breaking-off of swarf as it is formed, firstly, facilitates removal of the swarf, and secondly, facilitates the drilling of a passage of very high precision, with a fine surface quality, even when it is drilled to considerable depths.

Moreover, the frequency of variation in the forward (advancing) movement of the spindle 4 can be adjusted by the control unit 60. In the example shown in FIG. 5, the curve 102 has a sawtooth form, but it could be sinusoidal or of any other appropriate form.

In a modified version, the control unit 60 can enable the same result to be obtained by making use of a de-burring process such as that described in the document FR-A-2 873 315. When the torque exerted by the second motor 10, and therefore the rms current measured by the sensor 75, exceeds a predetermined value, the control unit 60 then causes the spindle 4 to execute a rapid reversing movement sufficient to withdraw the drill bit 30 fully from the passage or bore that is being drilled. It then causes the spindle to execute a rapid forward movement equal to the preceding reversing movement, so as to put it back in position for drilling before controlling a slower advance to continue the drilling operation.

The measures described above, for evacuating swarf and ensuring that a drilled passage of high quality is obtained, may be taken in the course of a drilling process such as that described with reference to FIG. 4, or only during some of its stages, or again when the rms current being supplied to the second motor 10 exceeds a predetermined value.

The control unit 60 may also be adapted to make use of an emergency stop procedure consisting in stopping the two motors 8 and 10 when the rms current being supplied to the second motor 10 exceeds a predetermined value.

The physical size of the module 6 is limited due to its construction, and in particular due to the fact that the first output shaft 32 is telescoped within the second output shaft 34.

In addition, the module 6 is able to be separated quickly from the casing 2, and replaced by another module, because of the releasable fastening device.

Other embodiments than that described above can also be envisaged. Thus, the sensors 71 and 72 may be arranged to supply to the unit 60 a further signal that represents the number of revolutions executed by the respective motors 8 and 10. The difference between the number of revolutions executed by the first motor 8 and by the second motor 10 is compared with a predetermined value stored in the memory 61, and the unit 60 causes the forward movement or backward movement of the spindle 4 to be stopped. The end stop abutments 52 and 53 can then be omitted.

Similarly, the motors 8 and 10 are not necessarily electric motors.

The examples described above make use of the signals given by a sensor of rms current supplied to the second motor 10. More generally, it is possible to make use of quantities other than current, for example quantities that represent torques exerted by one or both of the motors 8 and 10. Strain gauges, giving measurements of the applied torque or torques, can then be used. In the example described above a sensor 75 was arranged on the second motor 10, but it is also possible to provide a sensor for measuring a quantity that represents the torque exerted by the first motor 8, in particular for the purpose of detecting the end of either or each of strokes performed by the spindle 4.

In the example described above, the selection of control programs is made as a function of the number of layers in the element to be drilled, and the characteristics of the materials in its various layers. In other versions, characteristics of the passage or bore itself may equally well be taken into account.

In a modified version, the machine tool 1 may be a machine for carrying out other types of machining operation, in particular milling operations. For such purposes the spindle is equipped with (for example) milling cutters.

Figure 6:
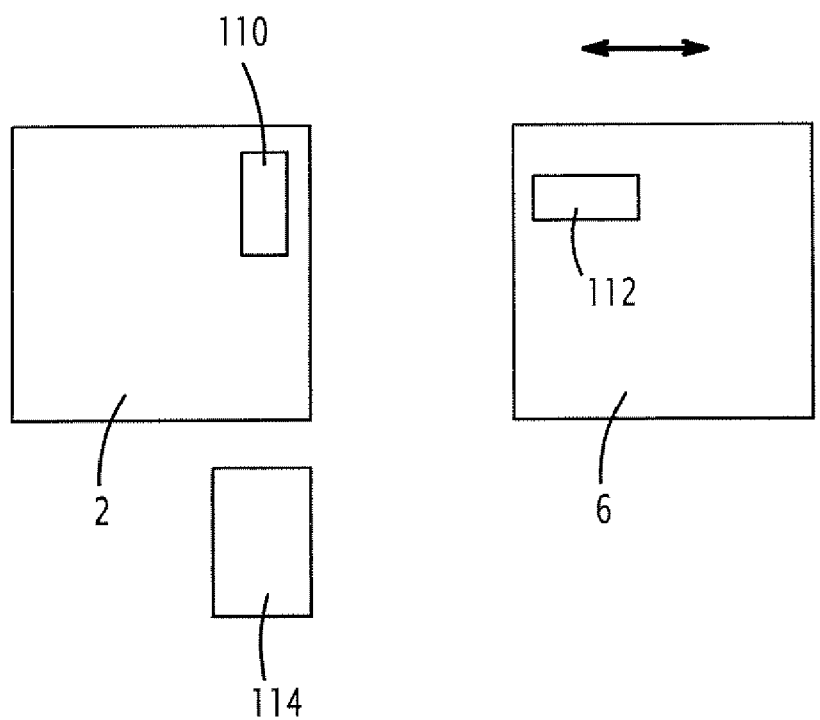
FIG. 6 is a diagram showing a modified embodiment of the invention.

In a further version, and as shown in FIG. 6, the casing 2 (i.e. in this context the machine tool without its module 6) includes a radio frequency identification (RFID) chip 110 that is for example fitted in the casing 2, and the module 6 includes a remote identification system 12 for identifying the casing 2 by reading the RFID chip 110 electromagnetically. This system 112 is for example fitted in the module 6. The module 6 and its control unit 60 are thereby adapted to identify the casing 2 and to execute the operating programs that are specific to that particular casing 2. The same module 6 can thus be used with different casings 2, each of these casings having a different drive mechanism 12, so that the cost of the machine tool 1 is quite low.

In yet another version, a portable writing unit 114 enables various parameters characteristic of the drive mechanism 12 to be written into the RFID chip 110. These various parameters can be made use of by the operating programs of the control unit 60. They may for example be values of predetermined speeds of rotation and advance.

In a still further version, the identification system 112 is adapted to work in writing mode with the RFID chip 110, in such a way as to store in the RFID chip 110 the above-mentioned data and/or tracking parameters.

What is claimed is:

1. A machine tool, of the type comprising:
    a casing;
    a toolholder spindle disposed along an axis and adapted to carry a tool bit;
    a drive mechanism for driving the toolholder spindle, comprising:
        a first drive member for rotating the spindle about its axis relative to the casing; and
        a second drive member for driving the spindle in translation along its axis relative to the casing, the second drive member being screwed on a threaded portion of the spindle, whereby the spindle advances or reverses along its axis as a function of the relative speed of rotation between the first drive member and the second drive member;
    a first motor coupled to the drive mechanism, for causing the first drive member to rotate;
    a second motor coupled to the drive mechanism, for causing the second drive member to rotate; and
    a control unit for controlling the first motor and second motor;
    wherein the control unit is adapted to control the first motor and second motor independently, so as to adjust, independently of each other, the speed of rotation of the first drive member and the speed of rotation of the second drive member; and
    wherein the first motor has a first output shaft arranged to rotate the first drive member, the second motor has a second output shaft arranged to rotate the second drive member, and the first shaft and second shaft are arranged one within the other.

2. A machine tool according to claim 1, including a module that comprises the first motor and second motor, the module being mounted removably on the casing.

3. A machine tool according to claim 2, wherein the module further comprises a releasable fastening device for fastening the module on the casing, and for enabling the module to be withdrawn.

4. A machine tool according to claim 2, wherein the module is removable from the casing in simple translation.

5. A machine tool according to claim 2, wherein the casing has a radio frequency identification chip, and the module includes a system for identification remote from the casing by reading the radio frequency identification chip.

6. A machine tool according to claim 1, wherein the control unit is adapted to control the first motor and second motor in such a way that the ratio between the speed of rotation of the first drive member and the speed of rotation of the second drive member is adjustable.

7. A machine tool according to claim 1, wherein the first motor and the second motor are electric motors, the machine tool having at least one sensor for measuring a quantity that represents the output torque of at least one of the motors, for the purpose of modifying the speed of rotation of at least one of the drive members.

8. A machine tool according to claim 7, wherein the quantity that represents the said torque is the current supplied to the said motor.

9. A machine tool according to claim 1, wherein control programs for the first motor and second motor are stored in the control unit, the programs being adapted so that the control unit controls rotation of the first motor and second motor as a function of the characteristics of the materials and/or the machining operation to be performed.

10. A machine tool according to claim 7, wherein control programs for the first motor and second motor are stored in the control unit, the programs being adapted so that the control unit controls rotation of the first motor and second motor as a function of the characteristics of the materials and/or the machining operation to be performed, and wherein the programs are adapted so that the control unit controls rotation of the first motor and second motor in such a way as to modify the speed of rotation of at least one of the drive members as a function of the characteristic quantity.

11. A machine tool according to claim 1, wherein the control unit is adapted to control the first motor and second motor in such a way that:
the first drive member rotates at constant speed; and
the second drive member rotates at a speed having an instantaneous value that oscillates about a mean value.

12. A machine tool according to claim 6, wherein the machine tool is adapted for modifying the speed of rotation of at least one of the drive members as a function of the result of a comparison between, firstly a value of the quantity that represents the output torque of at least one of the motors measured by the measuring sensor, and, secondly a predetermined value stored in the control unit.

13. A machine tool according to claim 12, wherein the quantity that represents the torque is the current supplied to the said motor.

14. A machine tool according to claim 1, wherein the machine tool is a drilling machine and the spindle is adapted to carry a drill bit for forming a bore.

15. A method of machining comprising the steps of:
providing a machine tool comprising:
a casing;
a toolholder spindle adapted to carry a tool bit;
a drive mechanism comprising a first drive member, a second drive member, a first input shaft, and a second input shaft, wherein the first input shaft is positioned inside of and coaxially engaged with the second input shaft;
a first motor coupled to the drive mechanism, wherein the first motor causes the first drive member to rotate, wherein the first input shaft is engaged with a first output shaft of the first motor;
a second motor coupled to the drive mechanism, wherein the second motor causes the second drive member to rotate, wherein the second input shaft is engaged with a second output shaft of the second motor; and
a control unit, wherein the control unit is adapted to control the first motor and the second motor;
controlling the speed of the first drive member with the control unit to rotate the spindle about its axis relative to the casing; and
controlling the speed of the second drive member independent of the first drive member with the control unit to drive the spindle in translation along its axis relative to the casing.

16. A method according to claim 15, further comprising the steps of:
controlling the speed of the first drive member to rotate at a constant speed; and
controlling the speed of the second drive member to rotate at a speed having an instantaneous value that oscillates about a mean value.

17. A method according to claim 15, further comprising:
controlling the first motor and the second motor in such a way that the ratio between the speed of rotation of the first drive member and the speed of rotation of the second drive member is adjustable, wherein the first motor and the second motor comprise electric motors and the machine tool further comprises at least one sensor, wherein the sensor measures a quantity that represents an output torque of at least one of the motors, for the purpose of modifying the speed of rotation of at least one of the drive members;
measuring, by means of the measuring sensor, the quantity that represents the output torque of at least one of the motors;
comparing the value of the said representative quantity to a predetermined value; and
modifying the speed of rotation of at least one of the drive members as a function of the result of the comparison.

18. A method according to claim 17, wherein the quantity that represents the torque comprises the current supplied to the said motor.

19. A method according to claim 15, comprising drilling a bore.

* * * * *